US006173170B1

United States Patent
Komoda

(10) Patent No.: US 6,173,170 B1
(45) Date of Patent: Jan. 9, 2001

(54) RADIO TELEPHONE APPARATUS CAPABLE OF DETECTING A DROP OF POWER SOURCE VOLTAGE

(75) Inventor: Motoyoshi Komoda, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 08/364,000

(22) Filed: Dec. 27, 1994

Related U.S. Application Data

(63) Continuation of application No. 07/644,666, filed on Jan. 23, 1991.

(30) Foreign Application Priority Data

Jan. 23, 1990 (JP) .................................................... 2-12844

(51) Int. Cl.[7] .......................... H04M 11/00; H04M 1/00; H04M 3/00; H04Q 7/20
(52) U.S. Cl. ........................ 455/407; 455/422; 455/462; 455/458; 455/552; 379/189; 340/825.44; 340/870.38; 370/311; 368/4; 704/224
(58) Field of Search ........................... 378/58; 370/100.1; 379/61, 63; 455/33.4, 343; 340/825.44

(56) References Cited

U.S. PATENT DOCUMENTS

| | | | |
|---|---|---|---|
| 4,182,934 | * 1/1980 | Keys et al. .............................. | 379/58 |
| 4,392,242 | * 7/1983 | Kai ....................................... | 455/33.4 |
| 4,618,917 | 10/1986 | Imazeki, et al. . | |
| 4,933,963 | * 6/1990 | Sato et al. .............................. | 379/58 |
| 4,964,121 | * 10/1990 | Moore ................................. | 370/100.1 |
| 4,972,454 | * 11/1990 | Toki et al. ............................. | 379/58 |
| 5,095,308 | * 3/1992 | Hewitt ................................. | 340/825.44 |
| 5,109,401 | * 4/1992 | Hattori et al. .......................... | 379/58 |
| 5,111,201 | * 5/1992 | Matsumura et al. ............ | 340/870.38 |
| 5,129,097 | * 7/1992 | Suzuki et al. ........................ | 455/33.2 |
| 5,142,563 | * 8/1992 | Nyuu et al. ............................ | 379/61 |
| 5,164,923 | * 11/1992 | Avis ......................................... | 368/4 |
| 5,175,759 | * 12/1992 | Mervoka et al. ...................... | 379/58 |
| 5,210,785 | * 5/1993 | Sato et al. ............................. | 379/58 |

FOREIGN PATENT DOCUMENTS

| | | | |
|---|---|---|---|
| 2020626 | 7/1989 | (CA) . | |
| 0203781 | * 12 1986 | (EP) .................................... | 455/343 |
| 0280501 | 8/1988 | (EP) . | |
| 0319211 | 6/1989 | (EP) . | |
| 0072234 | * 4/1987 | (JP) .................................... | 455/343 |
| 0143527 | * 6/1989 | (JP) .................................... | 455/343 |

* cited by examiner

Primary Examiner—William Cumming
(74) Attorney, Agent, or Firm—Sughrue, Mion, Zinn, Macpeak & Seas, PLLC

(57) ABSTRACT

An automobile radio telephone apparatus capable of detecting a drop of power source voltage to prevent a telephone channel from being occupied wastefully and to thereby enhance efficient use of channels with regard to the operation of an automobile radio telephone system. When the power source voltage is lower than a predetermined voltage, the apparatus informs the user of such an occurrence. On the lapse of a predetermined period of time and if a conversation is under way, the apparatus warns the user that it will execute a forcible conversation ending procedure and then executes it.

6 Claims, 4 Drawing Sheets

RADIO TELEPHONE APPARATUS CAPABLE OF DETECTING A DROP OF POWER SOURCE VOLTAGE

This is a Continuation of application Ser. No. 07/644,666 filed Jan. 23, 1991.

BACKGROUND OF THE INVENTION

The present invention relates to an automobile radio telephone apparatus capable of detecting a drop of power source voltage thereof and, more particularly, to an automobile radio telephone apparatus of the type informing, when a power source voltage thereof is lower than a predetermined voltage, the user of the apparatus of such a voltage drop and, on the lapse of a predetermined period of time and if a conversation is under way, warns the user that it will execute a forcible conversation ending procedure and then executes it This type of apparatus is successful in preventing a telephone channel from being occupied wastefully over a substantial period of time and thereby enhancing efficient use of channels available with the entire automobile radio telephone system.

An automobile radio telephone apparatus belongs to a family of mobile radio communication apparatuses extensively used today. It has been customary to construct an automobile radio communication apparatus such that when the output voltage of a battery drops below a predetermined voltage, an alarm tone is produced through a handset and/or an alarm is indicated on a display to alert the user to such an occurrence. This type of conventional apparatus allows the user to continuously hold a conversation despite the alarm tone or the alarm display, until the user ends it intentionally. Then, the battery voltage will in due course become lower than the operable voltage of the apparatus, causing the apparatus to be reset. When the apparatus is reset, it stops transmission and thereby ends the conversation halfway. However, a base station to which the apparatus is connected holds the channel several more seconds and then releases it, since the apparatus does not send an end-of-communication signal thereto. For such several seconds, therefore, the apparatus occupies the channel simply wastefully and thereby prevents channels of the entire automobile telephone system from being used efficiently.

SUMMARY OF THE INVENTION

It is therefore an object of the present invention to provide an automobile radio telephone apparatus capable of detecting a drop of power source voltage to prevent a telephone channel from being occupied wastefully and to thereby enhance efficient use of channels with regard to the operation of the entire automobile radio telephone system.

It is another object of the present invention to provide a generally improved automobile radio telephone apparatus.

A radio telephone apparatus of the present invention comprises a power source, a voltage measuring section for measuring the output voltage of the power source, a decision section for determining whether or not the voltage measured by the voltage measuring section is lower than a predetermined voltage, a radio section for allowing the automobile to selectively hold communication with a fixed telephone network or with another automobile, via a base station, connected to the radio telephone apparatus, occupying a channel of communication and a control section for controlling the radio section. The control section comprises a timer which is started in response to an output of the decision section for counting a predetermined period of time, and a conversation ending subsection responsive to an output of the timer for executing a conversation ending procedure when a conversation is under way.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
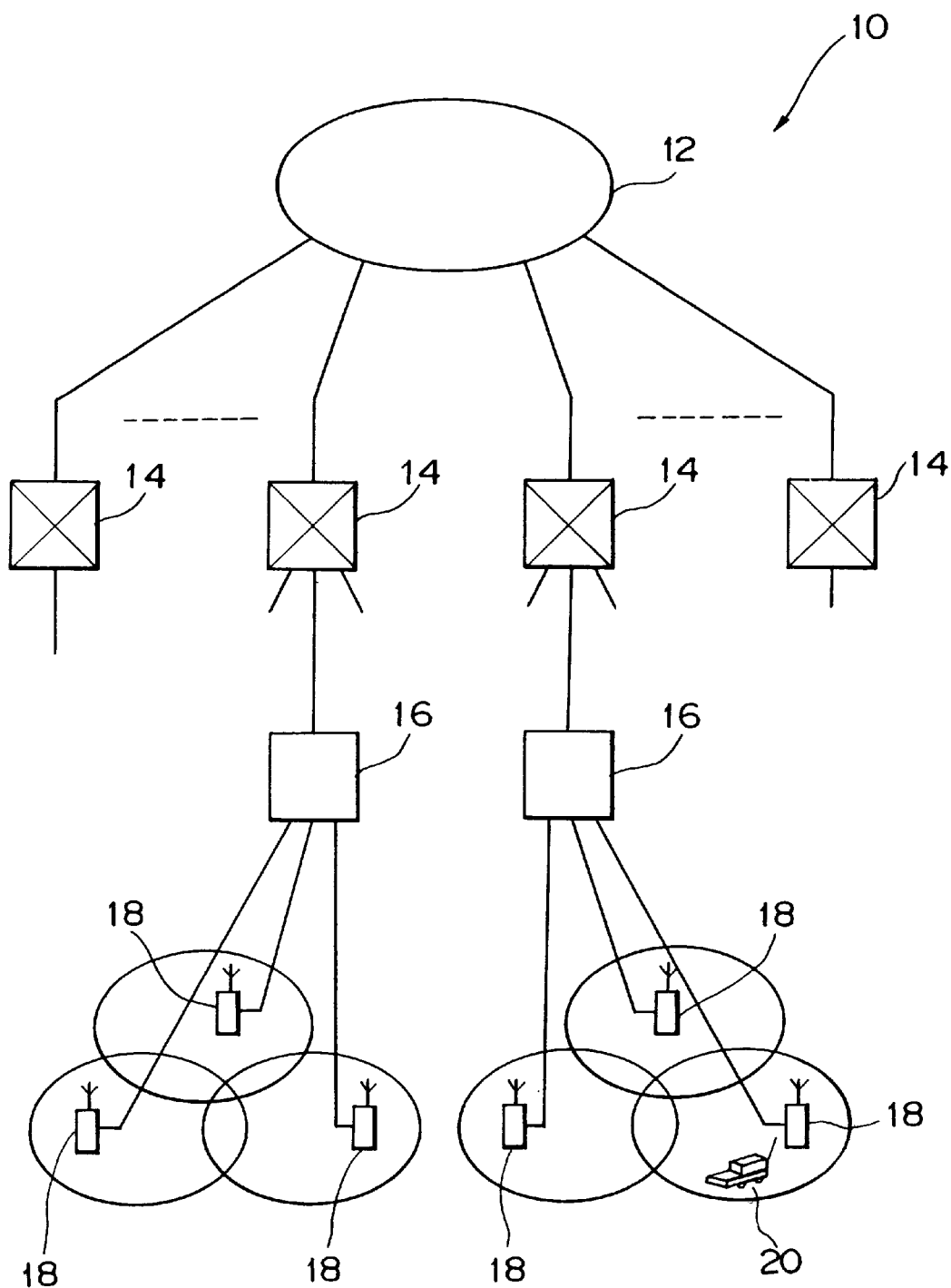
FIG. 1 is a block diagram schematically showing an automobile radio telephone system to which the present invention is applicable.

Referring to FIG. 1 of the drawings, an automobile radio telephone system to which the present invention is applicable is shown and generally designated by the reference numeral 10. As shown, the system has a plurality of automobile telephone exchanges 14 which are connected to a fixed telephone network 12. Radio channel control stations 16 each is connected to respective one of the exchanges 14. A plurality of base stations 18 are connected to each of the radio channel control stations 16. The reference numeral 20 designates an automobile loaded with a radio telephone apparatus.

Figure 2:
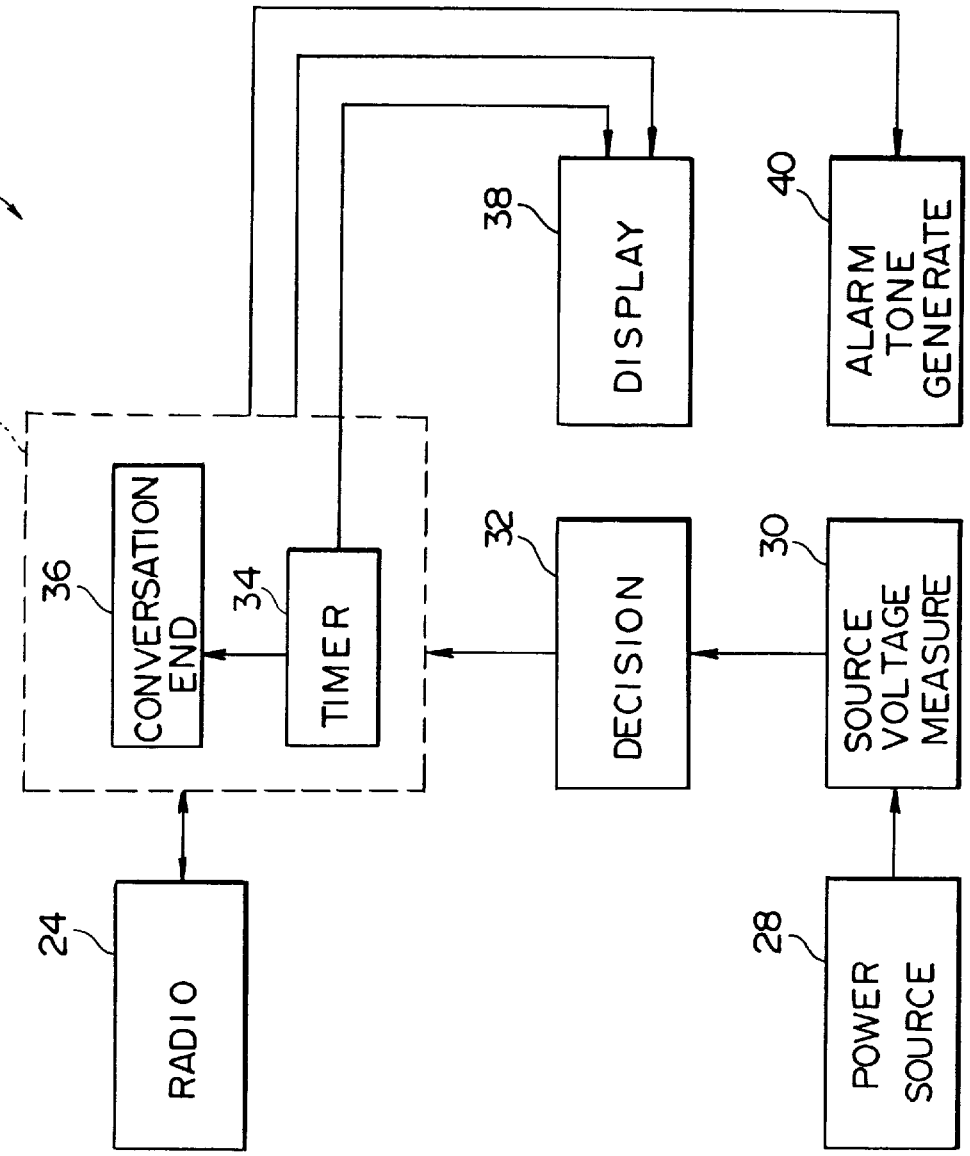
FIG. 2 is a block diagram schematically showing an automobile radio telephone apparatus embodying the present invention.

FIG. 2 shows an automobile radio telephone apparatus embodying the present invention. The apparatus, generally 22, has a radio section 24 for communicating with the fixed telephone network 12 or with another automobile 20, as desired, via a base station 18, connected to the apparatus 22, occupying a channel of communication. The radio section 24 per se is well known in the art and disclosed in, for example, U.S. Pat. No. 4,392,242 which is assigned to the assignee of the present application. A control section 26 controls the radio section 24. A battery or similar power source 28 powers various sections constituting the apparatus 22. A source voltage measuring section 30 measures the output voltage of the power source 28. A decision section 32 determines whether or not the voltage measured by the measuring section 30 is lower than a predetermined voltage. The control section 26 has a timer 34 and conversation ending means 36. The timer 34 is started on the basis of the output of the decision section 32 to count a predetermined period of time, e.g. 1 minute in the illustrative embodiment. The conversation ending means 36 executes a conventional procedure in response to an output of the timer 34. A display section 38 serves two different functions at the same time under the control of the control section 26, i.e., a function of reporting the user that the voltage of the power source 28 is lower than the predetermined voltage and a function of warning, in response to an output of the timer 34, the user that the conversation ending procedure will be forcibly executed. An alarm generating section 40 generates an alarm tone, as will be described. As noted above, the conversation ending procedure sends an end-of-communication signal to the base station, causing the base station to release the channel of communication.

Figure 3:
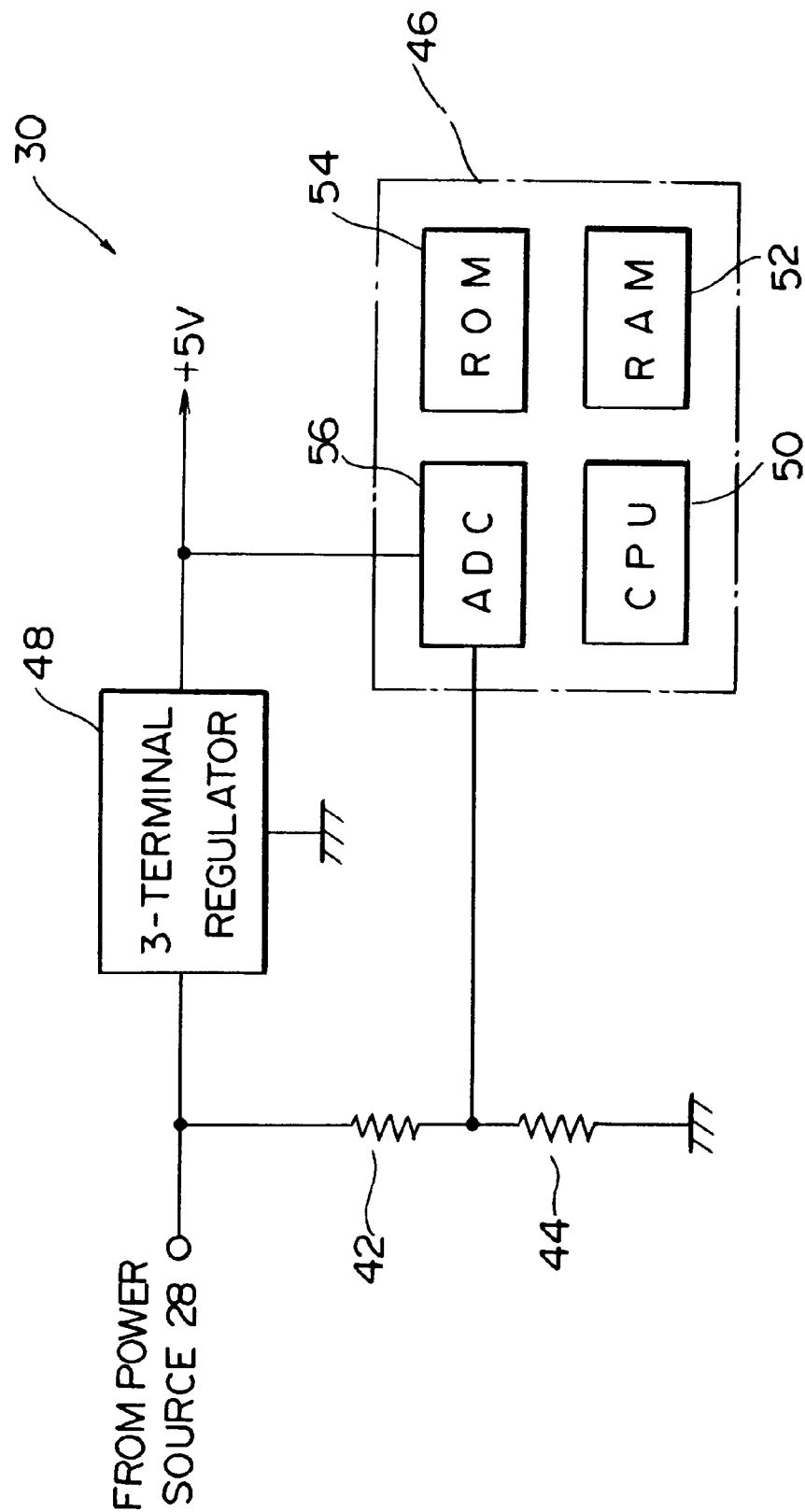
FIG. 3 is a block diagram schematically showing a specific construction of a source voltage measuring section included in the embodiment.

As shown in FIG. 3, the source voltage measuring section 30 has resistors 42 and 44 for dividing the output voltage of the power source 28, a 1-chip microprocessor 46 to which the divided voltage is applied, and a 3-terminal regulator 48. The microprocessor 46 has a CPU 50, a RAM 52, a ROM 54, and an analog-to-digital converter (ADC) 56 which receives the divided voltage. The ADC 56 operates by using the output voltage of the regulator 48 as a reference voltage and has 8-bit resolution. Assuming that the voltage division ratio of the resistors 42 and 44 is 1:1, then the AD conversion value will be "255" when the voltage of the power source 28 is 10 volts. The decision of the output of the ADC 56 by the decision section 32 is implemented by the software of the control section 26. The microprocessor 46 may comprise MC68HC11A08.

Figure 4:
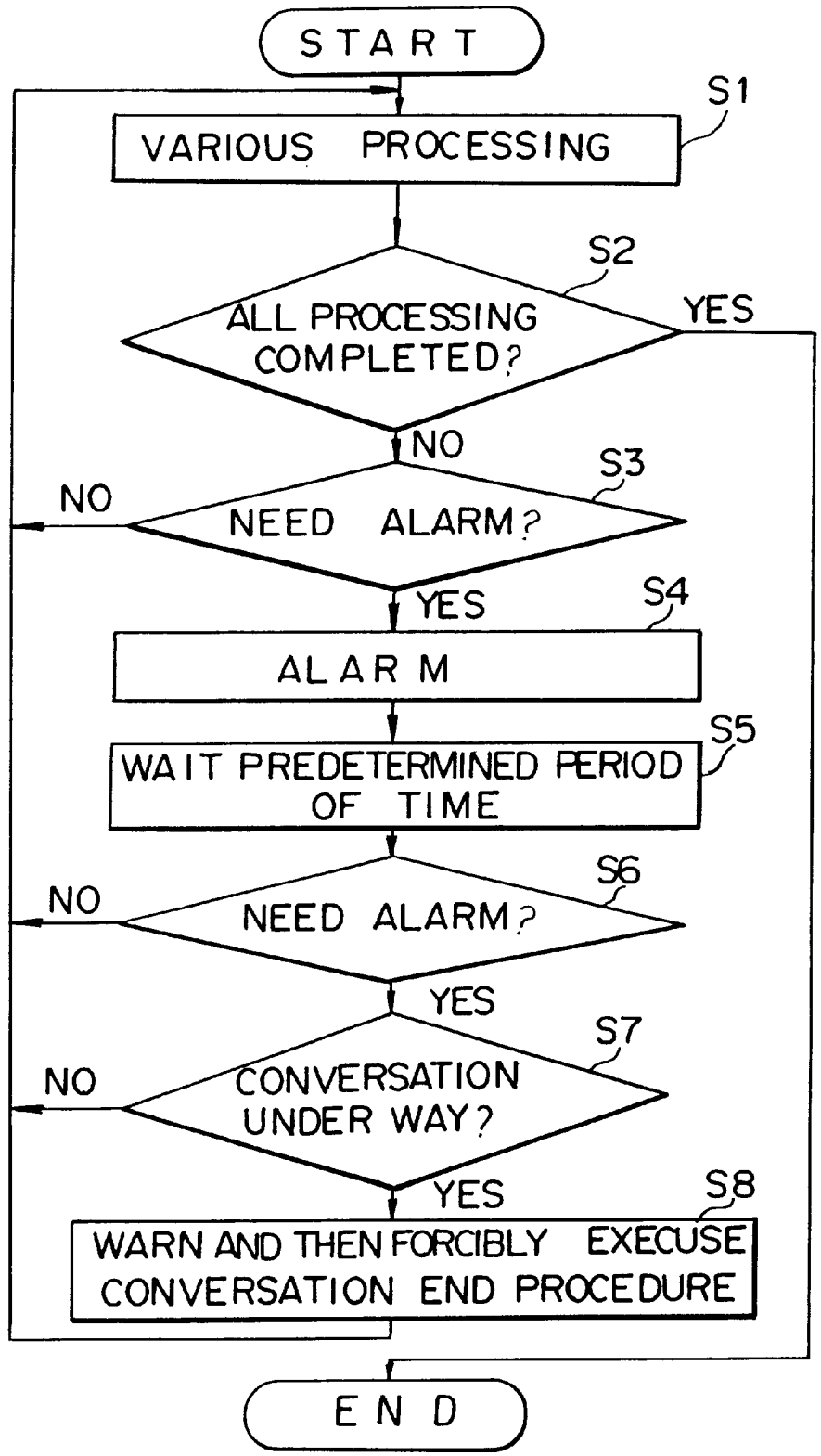
FIG. 4 is a flowchart demonstrating a specific operation of a control section also included in the embodiment.

A specific operation of the control section 26 will be described with reference to FIG. 4. The control section 26 may comprise a CPU (e. g. $\mu$PD70008AG), a ROM (e.g. MBM27C512). and a RAM (e.g. $\mu$PD4464G). In the figure, a step S1 is representative of various kinds conventional processing such as channel connection including control over the connection of a transmitter or a receiver to the radio section 24, and man-machine interface associated with an operating section and the display section 38. In a step S2, whether or not all such processing have been completed is determined and, if not, the program advances to a step S3. In the step S3, the control section 26 references information being applied thereto from the decision section 32 to see if an alarm should be produced. If the answer of the step S3 is NO, the program returns to the step S1 while, if it is YES, the program advances to a step S4. In the step S4, the control section 26 informs the user of the drop of the voltage of the power source 28, i.e., it commands the display 38 to show an alarm state thereon and commands the alarm tone generating section 40 to generate an alarm tone. This is followed by a step S5 in which the program waits until the timer 34 counts a predetermined period of time, i.e., 1 minute. Then, in a step S6, the control section 26 again determines whether or not an alarm is necessary and, if the answer is NO, returns to the step S1. If the answer of the step S6 is YES, the conversation ending means 36 determines whether or not a conversation is under way (S7). If the answer of the step S7 is YES, the conversation ending means 36 produces a warning indicating that the conversation will be forcibly ended and then executes a conventional conversation ending procedure, as explained above. Thereupon, the program returns to the step S1. If the answer of the step S7 is NO, the program also returns to the step S1. The previously mentioned step S5 gives the user holding a conversation on the apparatus 22 a period of time for ending the conversation. This period of time is selected to expire before the apparatus 22 is reset after the generation of an alarm.

In summary, it will be seen that the present invention provides an automobile radio telephone apparatus which prevents a telephone channel to be occupied wastefully and thereby enhances efficient use of channels with regard to the operation of an automobile radio telephone system.

Various modifications will become possible for those skilled in the art after receiving the teachings of the present disclosure without departing from the scope thereof.

What is claimed is:

1. A radio telephone apparatus comprising:

a power source;

a voltage measuring means for measuring an output voltage of said power source;

decision means for determining whether the voltage measured by said voltage measuring means is lower than a predetermined voltage;

a radio section for transmitting signals to and receiving signals from a fixed telephone network and other radio telephone apparatuses, via a base station, connected to said radio telephone apparatuses, occupying a channel of communication;

control means for controlling said radio section, said control means comprising time counting means started in response to an output of said decision means for counting a predetermined period of time, and conversation ending means responsive to an output of said time counting means for executing a conversation ending procedure when a conversation is under way, to signal said base station to release said channel of communication.

2. An apparatus as claimed in claim 1, further comprising reporting means controlled by control means for reporting that the output voltage of said power source is lower than said predetermined voltage.

3. An apparatus as claimed in claim 2, wherein said reporting means comprises at least one of alarm tone generating means for generating an alarm tone, and first display means for displaying that the output voltage of said power source is lower than said predetermined voltage.

4. An apparatus as claimed in claim 3, further comprising warning means for warning that said conversation ending means will forcibly execute said conversation ending procedure.

5. An apparatus as claimed in claim 4, wherein said warning means comprises second display means for displaying that said conversation ending means will forcibly execute said conversation ending procedure.

6. An apparatus as claimed in claim 5, wherein said first and second display means are constructed integrally with each other.

* * * * *